United States Patent Office 3,352,772

Patented Nov. 14, 1967

3,352,772

TRIPHENYL-ARSINE, -STIBINE, -BISMUTHINE AS PHOTOPOLYMERIZATION INITIATORS FOR ORGANIC MONOMERS

Tzu J. Mao, Royal Oak, Mich., assignor to General Motors Corporation, Detroit, Mich., a corporation of Delaware No Drawing. Filed June 25, 1964, Ser. No. 378,062

5 Claims. (Cl. 204—159.24)

ABSTRACT OF THE DISCLOSURE

Ethylenically unsaturated organic monomers such as methyl methacrylate containing a small but effective amount of a compound taken from the group consisting of triphenylbismuthine, triphenylstibine, and triphenylarsine are polymerized upon exposure to ultraviolet light. The triphenylbismuthine, triphenylstibine and triphenylarsine act as photopolymerization initiators.

This invention relates to the use of an initiator in the photopolymerization of monomers, and more particularly to the use of triphenylstibine, triphenylarsine, and triphenylbismuthine as the initiator in the photochemical polymerization of polymerizable ethylenically unsaturated organic monomeric compounds.

It is known the polymerizable ethylenically unsaturated organic monomeric compounds may be polymerized by the action of ultraviolet light. In such polymerization reactions, the rate of polymerization and also the length of the polymer chain produced are dependent on the nature and concentration of the monomeric material, the nature and concentration of an initiator, and also on the intensity and wavelength of the light.

It is the primary object of this invention to provide an improved class of initiators for the photopolymerization of polymerizable ethylenically unsaturated organic monomeric compounds. It is a further object to provide a process for the production of polymeric material by the photopolymerization of polymerizable ethylenically unsaturated organic monomeric compounds in which the rate of polymerization is markedly increased for a given light intensity of the appropriate wavelength. These and other objects are accomplished by incorporating small but effective amounts of the photo initiator compound taken from the group consisting of triphenylstibine, triphenylarsine, and triphenylbismuthine in a monomer containing a polymerizable ethylenically unsaturated linkage and subjecting the solution to ultraviolet radiation until the polymerization has been effected.

Further objects and advantages of the present invention will be apparent from the following detailed description, reference being had to the following examples wherein preferred embodiments of the present invention are clearly shown.

In general the process of the invention may be carried out as follows. A suitable amount of the triphenylbismuthine, for example, is dissolved in an acrylic monomer and stirred until a homogeneous solution is obtained. If the acrylic monomer used has a sufficiently low vapor pressure, the solution may be placed in an open reaction receptacle under atmospheric pressure; however. if the acrylic monomer has a high vapor pressure, it may be necessary to place the solution in a closed vessel under a suitable superimposed pressure in order to prevent excessive loss of the monomer due to volatilization. If a volatile acrylic monomer under superimposed pressure is to be polymerized, the reaction vessel should be constructed of a material which permits the maximum amount of ultraviolet radiation to pass through the reaction vessel. The reaction vessel should not be constructed of soft glass since soft glass will not transmit wavelengths below 3,500 Angstroms. Pyrex glass will not transmit below about 3,000 Angstroms. Vycor test tubes are constructed of a material which will permit lower wavelengths radiation to pass through; these test tubes are frequently used in the laboratory for photochemical polymerization. The reactions of this invention in which a volatile acrylic monomer was used were carried out in Vycor test tubes which were fitted with a stopcock. The purpose of the stopcock is to prevent excessive volatilization and at the same time not to allow excessive pressures to be built up in the system. In addition, the stopcock was used primarily when it was desired to carry out the reaction in an oxygen-free atmosphere, such as nitrogen. To perform the reaction in a nitrogen atmosphere, it was first necessary to evacuate the system to a low pressure and then to flush it with a nitrogen atmosphere. This procedure is repeated three or four times to insure that all traces of air and/or oxygen have been removed. The initiator-containing acrylic solution is then subjected to ultraviolet light by means of an ultraviolet lamp (Hanovia) with a high pressure, mercury vapor arc tube providing radiation with wavelengths ranging from 1,849 Angstroms to 4,000 Angstroms positioned a distance of one to two inches away from the solution for periods of time ranging from 10 minutes to 30 minutes. As will hereinafter appear, clear, tough, solid polymers are obtained when one of the novel initiators described in this invention was used as the initiator in the photopolymerization of polymerizable vinyl type compounds.

*Example 1*

| | Parts by weight |
|---|---|
| Triphenylstibine | 6 |
| Glycidyl methacrylate | 300 |

The solution of these two components was prepared and placed in an aluminum dish at room temperature. The monomeric material was then subjected to radiation from an ultraviolet lamp which was positioned a distance of one to two inches from the solution. In 17 minutes a clear, tough, solid polymer was obtained. The yield of the polymer in this reaction was 30%.

*Example 2*

| | Parts by weight |
|---|---|
| Triphenylbismuthine | 6 |
| Glycidyl methacrylate | 300 |

The solution of these two components was prepared and placed in an aluminum dish at room temperature. The monomeric material was then subjected to radiation from an ultraviolet lamp which was positioned a distance of one to two inches from the solution. In 14 minutes a clear, tough solid polymer was obtained. The yield of the polymer in this reaction was 60%.

*Example 3*

| | Parts by weight |
|---|---|
| Triphenylstibine | 2 |
| Methyl methacrylate | 900 |

The solution of these two components was placed in a Vycor test tube which was fitted with a stopcock; it was degassed and flushed three times until the solution was blanketed under an atmosphere of nitrogen. It was then irradiated under the nitrogen atmosphere with ultraviolet light for 10 minutes. The polymer was precipitated from the solution with n-heptane. The yield of the polymer in this reaction was 5.3%.

*Example 4*

| | Parts by weight |
|---|---|
| Triphenylbismuthine | 3 |
| Methyl methacrylate | 900 |

The solution of these two components was placed in a Vycor test tube which was fitted with a stopcock; it was degassed and flushed three times with nitrogen until the solution was blanketed under an atmosphere of nitrogen. It was then irradiated under the nitrogen atmosphere with ultraviolet light for 10 minutes. The polymer was precipitated from the solution with n-heptane. The yield of the polymer in this reaction as 27%.

*Example 5*

| | Parts by weight |
|---|---|
| Triphenylarsine | 0.1 |
| Methyl methacrylate | 900 |

The solution of these two components was placed in a Vycor test tube which was fitted with a stopcock; it was degassed and flushed three times with nitrogen until the solution was blanketed under an atmosphere of nitrogen. It was then irradiated under the nitrogen atmosphere with ultraviolet light for 10 minutes at 20° C. The polymer was precipitated from the solution with n-heptane. The yield of the polymer in this reaction was 0.68%.

*Example 6*

| | Parts by weight |
|---|---|
| Triphenylstibine | 0.1 |
| Styrene | 900 |

The solution of these two components was placed in a Vycor test tube which was fitted with a stopcock; it was degassed and flushed three times with nitrogen until the solution was blanketed under an atmosphere of nitrogen. It was then irradiated under the nitrogen atmosphere with ultraviolet light for 16 minutes at 20° C. The polymer was precipitated from the solution with n-heptane. The yield of the polymer in this reaction was 2.7%.

*Example 7*

| | Parts by weight |
|---|---|
| Triphenylbismuthine | 0.15 |
| Styrene | 900 |

The solution of these two components was placed in a Vycor test tube which was fitted with a stopcock; it was degassed and flushed three times with nitrogen until the solution was blanketed under an atmosphere of nitrogen. It was then irradiated under the nitrogen atmosphere with ultraviolet light for 16 minutes at 20° C. The polymer was precipitated from the solution with n-heptane. The yield of the polymer in this reaction was 4.7%.

As is indicated by the above examples, the compounds taken from the group consisting of triphenylstibine, triphenylbismuthine, and triphenylarsine are effective initiators in the photopolymerization of a wide range of polymeric materials. This process is particularly useful when applied to the production of polymeric material from the polymerizable ethylenically unsaturated compounds which possess one or more unsaturated groups having the following structural formula in their molecules:

$$CH_2{=}C<$$

Examples of such compounds are methyl methacrylate,
styrene, and
glycidyl methacrylate, as indicated by the above examples, as well as vinyl acetate,
acrylonitrile,
1,3-butadiene,
ethyl crotonate,
n-butyl acrylate,
n-butyl methacrylate,
chlorotrifluoroethylene,
ethyl acrylate,
ethyl methacrylate,
2-ethylhexyl acrylate,
glycidyl acrylate, 2-methoxyethyl methacrylate,
methyl acrylate,
α-methylstyrene,
meta-methylstyrene,
para-methylstyrene,
methyl vinyl ketone,
perfluoropropylene,
tetrafluoroethylene,
vinyl benzoate,
vinyl bromide,
vinyl butyrate,
vinyl chloride,
vinyl fluoride,
N-vinylcarbazole,
N-vinylpyrrolidone,
vinylidene chloride, and
vinylidene fluoride.

Included in the term acrylic monomer as used herein, as illustrated in the examples, refers to esters of acrylic acid or methacrylic acid. These esters are formed by reacting one of the acids mentioned above with an alcohol or a substituted alcohol containing one to eighteen carbon atoms. Suitable alcohols include methyl alcohol,
butyl alcohol,
hexyl alcohol,
2-ethylhexyl alcohol,
decyl-octyl alcohol,
lauryl alcohol,
stearyl alcohol,
dimethylaminoethyl alcohol,
t-butylaminoethyl alcohol,
glycidyl alcohol,
2-methoxyethyl alcohol,
hydroxyethyl alcohol, and
hydroxypropyl alcohol.

The polymerization of unsaturated compounds in the process of the present invention can be brought about under both homogeneous and heterogeneous conditions.

When the photopolymerization is carried out in an air atmosphere, the useful concentration range of the initiator taken from the group consisting of triphenylstibine, triphenylbismuthine, and triphenylarsine is 0.08 to 2.0 percent by weight with the preferred concentration being 1.0 percent by weight.

Since oxygen interferes with the photopolymerization of many ethylenically unsaturated organic monomers, it is frequently preferable or necessary to carry out the polymerization in an oxygen-free atmosphere such as nitrogen, carbon dioxide, helium, argon, and so forth. When the photopolymerization is carried out in an oxygen-free atmosphere, the rate of reaction is faster, the polymer that is formed has a higher molecular weight, and the yield of the polymer is much higher. If the reaction is carried out in an oxygen-free atmosphere, such as nitrogen, as is indicated in Examples 3 through 7, the required initiator concentration range is lower, between 0.003 to 1.1 percent by weight with the preferred concentration being about 0.5 percent by weight. In general, the use of an oxygen-free atmosphere reduces the proportions of initiators taken from the group consisting of triphenylstibine, triphenylbismuthine, and triphenylarsine needed.

While the embodiments of the present invention herein disclosed constitute preferred forms, it is to be understood that other forms might be adopted.

What is claimed is as follows:

1. A process for the production of polymeric material which comprises irradiating an acrylic monomer with ultraviolet light in the presence therein of a small but effective amount of an initiator taken from the group consisting of triphenylbismuthine, triphenylstibine and triphenylarsine.

2. A process according to claim 1 in an air atmosphere wherein said initiator taken from the group consisting of triphenylbismuthine, triphenylstibine and triphenylarsine is employed in an amount within the range of from 0.08 to 2.0% by weight of the acrylic monomer.

3. A process according to claim 1 in an oxygen-free atmosphere wherein said initiator taken from the group consisting of triphenylbismuthine, triphenylstibine and triphenylarsine is employed in the amounts within the range of from 0.003 to 1.1% by weight of the acrylic monomer.

4. A process for the production of polymeric material which comprises irradiating styrene with ultraviolet light in the presence therein of a small but effective amount of an initiator taken from the group consisting of triphenylbismuthine, triphenylstibine and triphenylarsine.

5. A process for the production of polymeric material which comprises irradiating a polymerizable ethylenically unsaturated organic monomer taken from the group consisting of methylstyrene, vinyl acetate, methyl vinyl ketone and vinyl butyrate with ultraviolet light in the presence therein of a small but effective amount of the initiator taken from the group consisting of triphenylbismuthine, triphenylstibine, and triphenylarsine.

References Cited

UNITED STATES PATENTS 2,840,617 6/1958 Shokal -------------- 260—95

SAMUEL H. BLECH, *Primary Examiner.*

RICHARD TURER, *Assistant Examiner.*